United States Patent [19]

Stent

[11] Patent Number: 5,761,285
[45] Date of Patent: Jun. 2, 1998

[54] UNIVERSAL TELEPHONY APPLICATION CLIENT THAT IS CONFIGURABLE FROM A PROFILE FOR A TELPHONE CALL CAMPAIGN

[75] Inventor: Robert J. Stent, Westford, Mass.

[73] Assignee: Davox Corporation, Mass.

[21] Appl. No.: 252,338

[22] Filed: Jun. 1, 1994

[51] Int. Cl.⁶ ................................................. H04M 15/00
[52] U.S. Cl. ........................... 379/112; 379/265; 379/309
[58] Field of Search .................................. 379/112, 113, 379/133, 265, 266, 308, 309

[56] References Cited

U.S. PATENT DOCUMENTS

| | | | |
|---|---|---|---|
| 4,475,013 | 10/1984 | Lee et al. | 379/355 |
| 5,127,045 | 6/1992 | Cragum | 379/88 |
| 5,179,589 | 1/1993 | Syu | 379/265 |
| 5,214,688 | 5/1993 | Szlam et al. | 379/67 |
| 5,247,569 | 9/1993 | Cave | 379/113 |
| 5,299,195 | 3/1994 | Thorne et al. | 379/93 |
| 5,299,260 | 3/1994 | Shaio | 379/265 |
| 5,327,490 | 7/1994 | Cave | 379/216 |
| 5,371,787 | 12/1994 | Hamilton | 379/386 |
| 5,381,470 | 1/1995 | Cambray et al. | 379/216 |

FOREIGN PATENT DOCUMENTS 9208309   5/1992   WIPO .......................... H04M 1/272

*Primary Examiner*—Stephen Chin
*Assistant Examiner*—Kevin Kim
*Attorney, Agent, or Firm*—Daniel J. Bourque; Kevin J. Carroll

[57] ABSTRACT

A universal telephony application client (TAC) that can be dynamically configured for a specific telephone call campaign running on a telephony platform system where upon the beginning of a call campaign, the universal TAC is initialized from an initialization profile specific to a telephone call campaign. The universal TAC operates as individual TAC threads to control processing of call records or incoming calls according to the parameters provided in the initialization profile. The initialization profile is modifiable before a call campaign, at the commencement of a call campaign, or at any time during a call campaign. All campaign TACs created subsequent to modifying the initialization profile will be modified to include the new parameters.

30 Claims, 4 Drawing Sheets

5,761,285

UNIVERSAL TELEPHONY APPLICATION CLIENT THAT IS CONFIGURABLE FROM A PROFILE FOR A TELPHONE CALL CAMPAIGN

RELATED APPLICATION

This application is related to co-pending U.S. patent application Ser. No. 08/252,921, filed on Jun. 1, 1994, Attorney Docket No. DAVOX-119XX, entitled A Method for Allocating Agents with Predetermined Attributes To A Telephone Call Campaign, assigned to the assignee of the present invention and fully incorporated herein by reference.

FIELD OF THE INVENTION

This invention relates to telephony management systems, and more particularly, to a universal telephony application client that is dynamically configurable from a profile for a given telephone call campaign.

BACKGROUND OF THE INVENTION

As is known in the art, many businesses use telephony system including automated call distribution systems and predictive dialers to process incoming calls and outgoing call records. Telephone system resources such as telephone lines and agents must be managed in real time to process call records for outgoing calls, and to process incoming calls. Such telephone system resource management has been performed by individual agents or agent supervisors. However, in telephony systems, such resources are handled automatically by the telephony system to allocate the resources and handle events to allow calls to be processed.

As is also known, one method of managing such resources is by creating a process on the telephony call distribution platform to handle a single outgoing call record or incoming call. The process or thread only handles a single call record. The process obtains system resources such as trunk lines and agents, and follows the processing of the call record or incoming call until completion. The process terminates when the telephone call or processing of the telephone call is complete. Many processes or threads can run at the same time, each handling a single call record or incoming call.

There are many parameters which are required to process outgoing or incoming calls for each specific call campaign or series of planned telephone calls. Call campaigns all have different requirements, and specifically designed processes are needed to handle the different requirements unique to each call campaign. Also, the processing of incoming calls and events is different from outgoing call campaigns and requires processes that are capable of handling the different requirements. Therefore, specific incoming and outgoing call processes must be individually created for each call campaign and designed to meet the specific requirements of that call campaign. Such prior art processes are often hard coded or programmed, which requires a considerable amount of time to program and compile to create the campaign specific process. Most importantly, such processes cannot be modified in real-time, to conform to the requirements of a call campaign then being executed.

Accordingly, what is needed is a universal telephony application process which is general enough for most call campaigns, but can be specifically and dynamically modified for the requirements of each individual call campaign.

SUMMARY OF THE INVENTION

In accordance with the present invention, a method for creating a universal telephony application client (TAC) or process that can be utilized as is or configured for a specific call campaign is provided. Upon beginning a campaign, the universal TAC is initialized from a campaign configuration database specific to a call campaign. The universal TAC then processes the call records according to the parameters provided in the campaign configuration profile.

The campaign configuration is modifiable before a call campaign, or at the commencement of a call campaign, or at any time during a call campaign. All TACs created subsequent to modifying the campaign configuration profile will include the new parameters.

A universal TAC may be started by one of the campaign managers to process a call record for an outbound dialing application or to process an incoming call, or it may be started by a system wide event server in order to perform some programmed response to the occurrence of an event. Universal TACs may also be started by other entities to accomplish a variety of other chores such as for controlling the operation of other system servers.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

The universal telephony application client (TAC) or process in accordance with the present invention is utilized by a telephony platform system as described by co-pending U.S. patent application, Attorney Docket No. DAVOX-119XX, assigned to the assignee of the present invention, and incorporated herein by reference. The universal telephony application client or process is utilized to control the handling of call records (outgoing calls), incoming calls and other events that occur in the system.

Figure 1A:
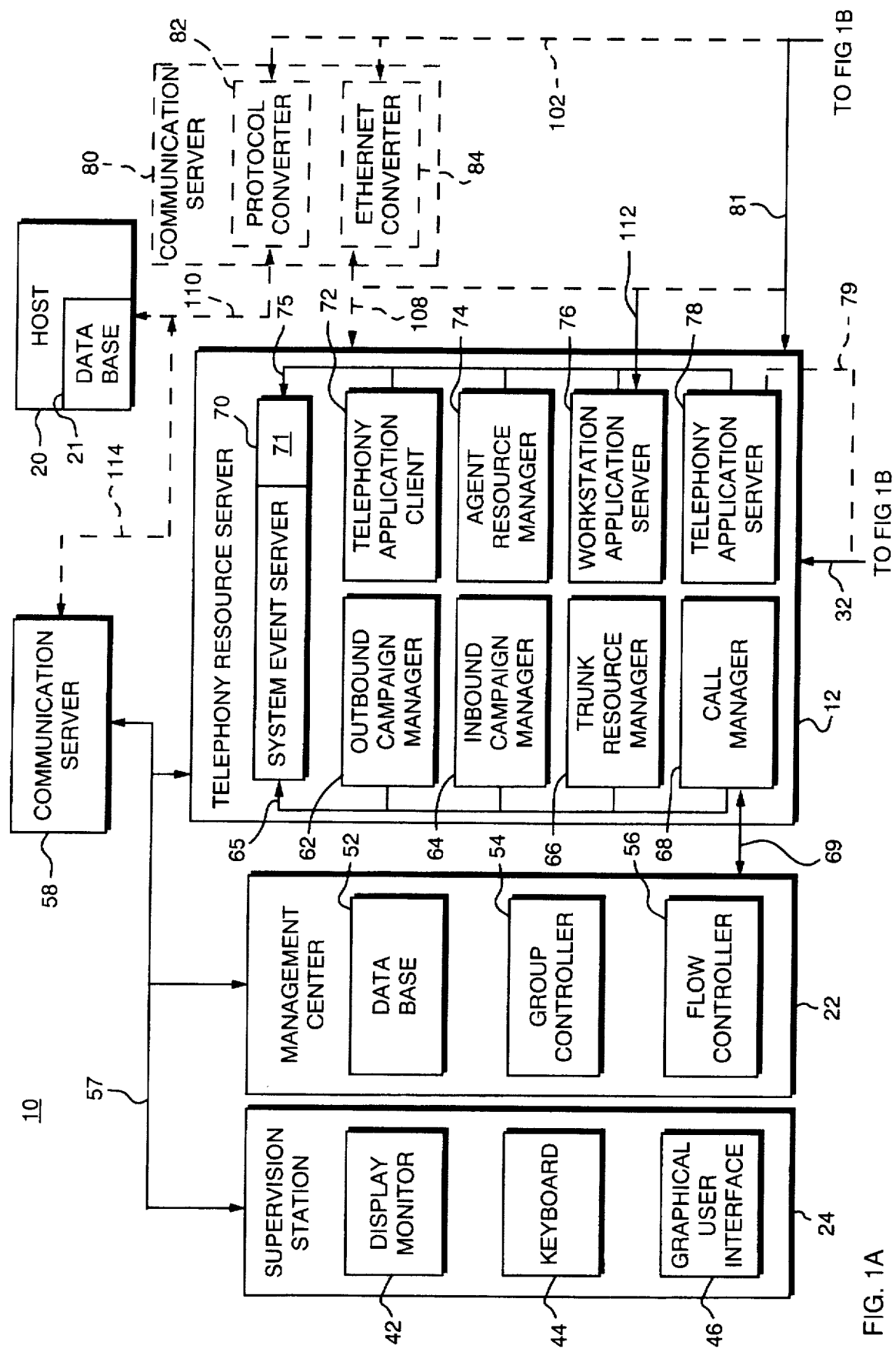
FIG. 1 is a block diagram of a telephony system capable of mixing inbound call processing with outbound dialing automation and for providing the telephony application client of the present invention.
Figure 1B:
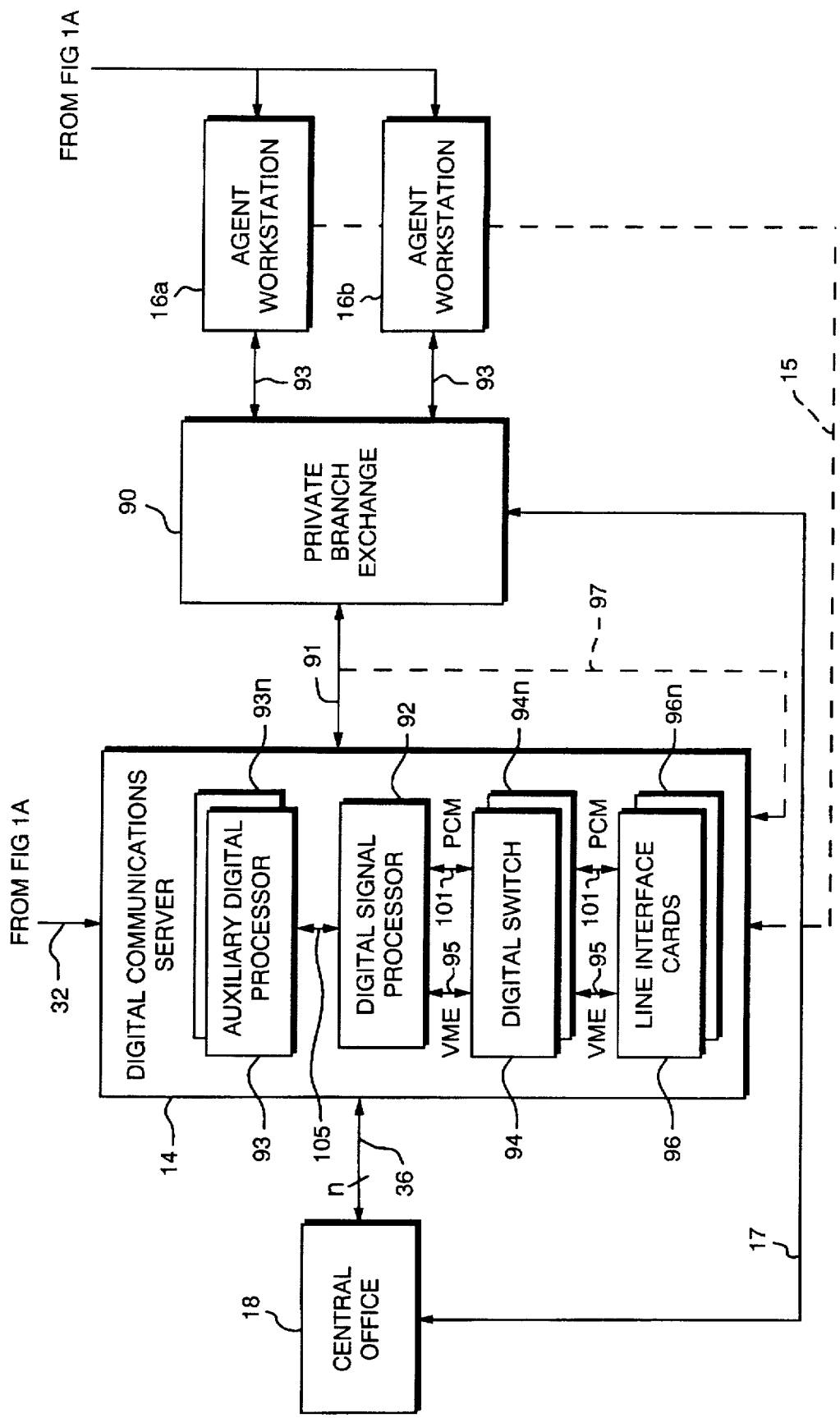

Referring now to FIG. 1, a telephony platform system 10 is provided. A telephone resource server 70 interfaces with digital communication server 14 which handles telephone lines coming from central office 18, and also interfaces with a plurality of agent workstations 16a–16n. Telephone resource server 70 comprises many subsystem, including outbound campaign manager 62, inbound campaign manager 64, trunk resource manager 66, agent resource manager 74, and system server 71. Telephony application client (TACs) 72 are utilized by the telephony system 10 to control utilization of system resources to process call records and incoming calls.

Figure 2:
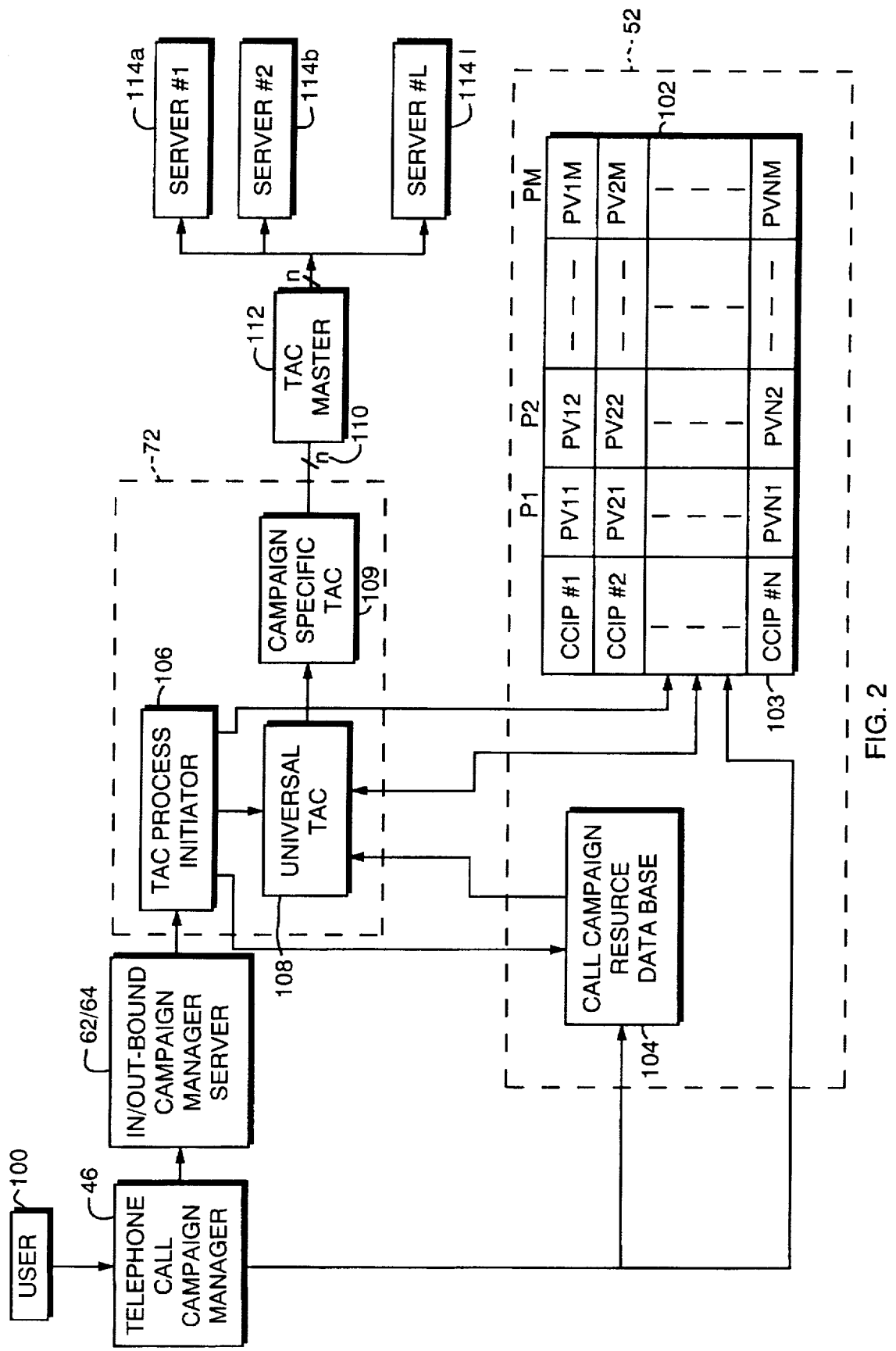
FIG. 2 is a more detailed block diagram of the Telephony Application Client according to the present invention.
Figure 3:
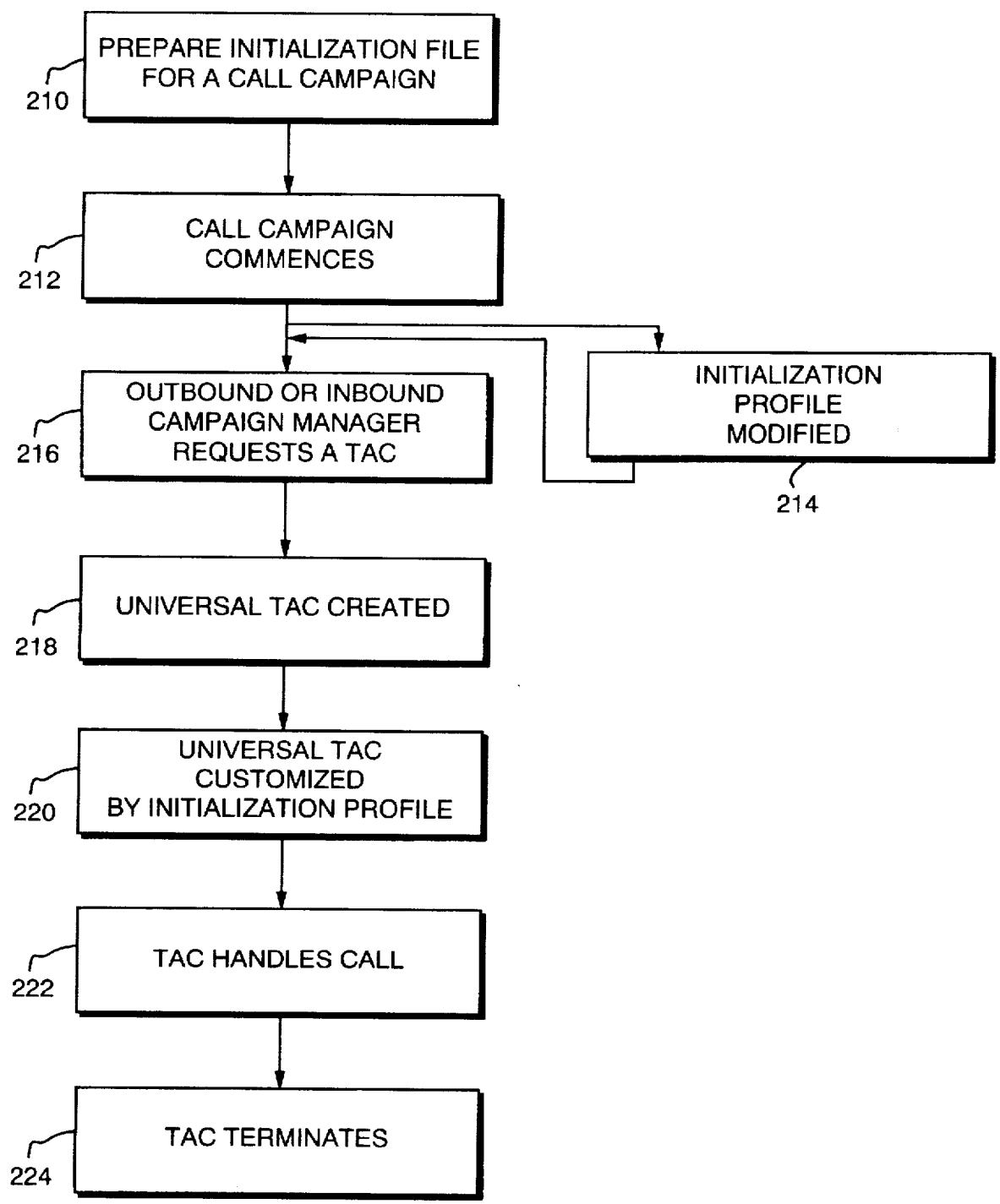
FIG. 3 is a flow chart illustrating the method for creating and initializing a universal TAC according to the present invention.

A user initiates a specific call campaign to process either incoming or outgoing calls. Each campaign has a profile or configuration database which sets up parameters to direct how the campaign shall proceed. One of the parameters is whether a specifically designed TAC may be used, or can a universal TAC be used. Upon commencing a campaign, the user may modify certain parameters, some of which may modify the TACs created for that campaign. These parameters will be stored in the TAC initialization profile as a database, step 210, FIG. 3. As shown in FIG. 2, the user 100, interfacing through a campaign manager application as a graphical user interface 46 running supervisor station 24 modifies database 52 to create a campaign specific configuration database or profile 102. This profile contains campaign specific information as shown in Table 1 below. Additionally, the campaign manager application 46 is also responsible for generating and maintaining a campaign resource database 104 which includes a unique record identifier number which allows the TAC 72 to retrieve a given record under control of the inbound or outbound campaign manager 62, 64.

The campaign resource database 104 is independent of record layout or format and thus, can interface with many types of record formats or databases available from a host computer. This database contains a mapping table which tells the TAC where a given record is, such as the customer telephone number to be dialed. Thus, the mapping table indicates the location of a record in a host computer regardless of the format of that record.

When user 100, through campaign manager 46 directs inbound or outbound campaign manager 62/64 to begin a campaign, inbound or outbound campaign manager 62/64 directs the TAC Daemon 106 to start a universal TAC 108. The universal TAC initializes itself by reading the campaign configuration database 102 containing information on how the campaign calls are to be handled, such as shown in table 1 and subsequently awaits any record identifiers of records to be processed.

As a call campaign commences to run, step 212, the outbound campaign manager requests TACs to be created to process call records, or if it is an inbound campaign, the inbound campaign manager requests TACs to be created to handle incoming calls, step 216. A TAC is started with a single input parameter. This parameter may be a record ID, an event ID, or some other unique ID with which the TAC may query a campaign resource database 104 to obtain further information about the call to be placed or the incoming call to handle.

A TAC thread 110a, 110n is created for each record to be processed. A TAC thread is one execution of the TAC for a given call record. Multiple TAC threads 110a, 110n will generally be executing simultaneously. Each TAC thread controls or performs the operation as directed by the inbound/outbound campaign manager such as dialing, etc.

At step 218, the universal TAC commences to operate as a process or thread on the telephone system platform to handle the requested event. One processor or thread is operative for each event (call) to be handled. In the preferred embodiment, the universal TAC is implemented as a Unix lightweight process which is well known in the art, and which minimizes system memory and process scheduling requirements. At step 220, the created universal TAC accesses the initialization profile based on the ID parameter, for customizing parameters. For example, such parameters could specify how many rings to allow before a call is considered a no-answer, how long to wait before redialing a busy number, and how many times to retry dialing a busy number. In the preferred embodiment, there are many possible parameters as shown in Table 1.

TABLE 1

| | |
|---|---|
| Busy Recall Delay | The number of minutes the dialer will wait to redial a busy number. |
| Rings For No Answer | The number of rings the dialer will allow before considering the call a no-answer. |
| Number Of Busy Recalls | The number of times the dialer will redial a busy number. |
| Answering Machine Detect | Can be enabled for the home and/or "other" phone number, but not for the business number. |
| Business Cutoff | Can be enabled to stop calling the business number after the specified time. |
| Call Options | Specifies the numbers which will be dialed and in what sequence. |
| Directory Assistance | Tells what to do if the agent enters the term code requesting directory assistance. The options are to end the call (i.e. not call directory assistance), call directory assistance on the next pass when the record is sent to the agent. |
| Drop | Gives options for handling a call which the dialer drops because no agent becomes available. |
| Hangup | Gives the options for handling a call which the customer hangs up on while on hold. |
| High And Dry | Determines the response to a call for which no progress is detected (no ringing, busy tone, etc.). |
| Home Cutoff | Can be enabled to stop calling the home number after the specified time. |
| Hang Up (during) Broadcast | Determines what to do when a customer hangs up during a non-hold message. |
| Location | Refers to the time zone location of the dialer. |
| Play Action | Determines after which messages the "back hold" message will be played. The back hold messages tells the customer to hold, an agent will be back on line shortly. |
| Play Messages | Determines which non-hold messages will be played. |
| Redial Business | Specifies what to do with a call when an agent enters that result code. |
| Redial Business Manual | Specifies what to do with a call when an agent enters that result code. |
| Redial Home Manual | Specifies what to do with a call when an agent enters that result code. |
| Redial Home | Specifies what to do with a call when an agent enters that result code. |
| Redial Other | Specifies what to do with a call when an agent enters that result code. |
| Redial Other Manual | Specifies what to do with a call when an agent enters that result code. |
| Recall Queuing | Can be enabled or disabled. When disabled, busies still go into the recall queue. |
| Sit Tone | Specifies what to do with a call that triggers a sit tone. |

Any of these parameters may also be modified while a campaign is running. If a parameter is modified, the new value is stored in the initialization profile, step 214.

At step 222, the customized universal TAC handles the call or event, including requesting resources from resource managers, such as trunk lines for calling from the trunk resource manager, and agents from the agent resource manager. Each TAC thread interfaces with the TAC master 112 to control operation of one or more system servers 114a–114n such as the trunk resource manager server 66, workstation application server 76, agent resource manager server 74 and telephony application server 78. As can be clearly seen from FIG. 2, each TAC thread such as TAC thread 110a may control multiple servers 114a–114n. The servers 114a–114n service the call record as directed by the TAC thread requesting service. The universal TAC process can also start user selected specific TACs to handle specific situations unique to a call campaign. The universal TAC will suspend while the specific TAC is running, and when the specific TAC terminates, the universal TAC continues processing. A TAC thread will handle a call record or call to completion, performing redials and wrap-up of completed calls as needed. Once the TAC completes its processing, the TAC thread notifies the process which started it and then terminates, step 224.

Such universal TACs are usable by many campaigns thus avoiding the problem of many different specific TACs required for each individual campaign.

Modifications and substitutions by one of ordinary skill in the art are considered to be within the scope of the present invention which is not to be limited except by the claims which follow.

What is claimed is:

1. A system for controlling how telephony system resources are to respond during processing of a telephone call record associated with at least first and second telephone call campaigns, said system comprising:
   at least first and second call campaign initialization profiles, each of said at least first and second call campaign initialization profiles including a plurality of dynamically modifiable campaign specific parameter values, each of said plurality of dynamically modifiable campaign specific parameter values specifying a call campaign parameter used to process telephone call records associated with said at least first and second telephone call campaigns respectively;
   at least one telephone call campaign manager, for initiating said at least first and second telephone call campaigns;
   at least one inbound/outbound campaign manager server, responsive to said at least one telephone call campaign manager, for controlling the initiation of a plurality of telephony application client processes, each telephony application client process, for controlling telephony system resource handling of one telephone call record; and
   a telephony application client process initiator, responsive to said at least one inbound/outbound campaign manager server and to said at least first and second call campaign initialization profiles, for initiating at least a first telephony application client process utilizing said plurality of dynamically modifiable campaign specific parameter values of said first call campaign initialization profile, and for initiating at least a second telephony application client process utilizing said plurality of dynamically modifiable campaign specific parameter values of said second call campaign initialization profile.

2. The method of claim 1, wherein said telephony system resources includes telephone trunks and agents.

3. The method of claim 1, wherein said at least a first telephone call campaigns includes an outgoing call campaign.

4. The method of claim 1, wherein said at least a first telephone call campaigns includes an incoming call campaign.

5. The method of claim 1, wherein said telephony application client process is implemented using UNIX based processes.

6. The method of claim 5, wherein said telephony application client processes are implemented using UNIX based lightweight processes.

7. The method of claim 1, wherein said telephony application client process is implemented using UNIX based universal state table processes.

8. The method of claim 1, wherein said dynamically modifiable campaign specific parameter values include a number representing how many minutes to wait before redialing a busy telephone number.

9. The method of claim 1, wherein said dynamically modifiable campaign specific parameter values include a number representing how many rings to allow before considering a telephone call to be a no-answer.

10. The method of claim 1, wherein said dynamically modifiable campaign specific parameter values include a number representing how many times a busy telephone number should be redialed.

11. The method of claim 1, wherein said dynamically modifiable campaign specific parameter values include enabling detecting that a telephone call has been answered by a telephone answering machine.

12. The method of claim 11, wherein said dynamically modifiable campaign specific parameter values include a predefined action to take upon detection that a telephone call has been answered by a telephone answering machine.

13. The method of claim 1, wherein said dynamically modifiable campaign specific parameter values include an action to take when a telephone call receiver hangs up while on hold.

14. The system of claim 1, further including a telephony application client process master, responsive to each telephony application client process, for controlling at least one server in said telephony system.

15. The system of claim 1, further including at least a first call campaign configuration data base including said at least first and second call campaign initialization profiles.

16. The system of claim 15, wherein said first telephony application client process initiated by said telephony application client process initiator is initialized by reading said first call campaign initialization profile in said call campaign configuration data base.

17. The system of claim 15, wherein said second telephony application client process initiated by said telephony application client process initiator is initialized by reading said second call campaign initialization profile in said call campaign configuration data base.

18. The system of claim 1, wherein said plurality of dynamically modifiable campaign specific parameter values included in said at least first and second call campaign initialization profiles are dynamically modifiable by said at least one telephone call campaign manager after commencing said processing of telephone call records associated with said at least first and second telephone call campaigns respectively.

19. The system of claim 18, wherein a third telephony application client process initiated by said telephony application client process initiator is initialized with dynamically modified first call campaign specific parameter values by reading said first call campaign initialization profile modified after commencing said processing of telephone call records associated with said at least first telephone call campaign.

20. The system of claim 18, wherein a fourth telephony application client process initiated by said telephony application client process initiator is initialized with dynamically modified second call campaign specific parameter values by reading said second call campaign initialization profile modified after commencing said processing of telephone call records associated with said at least second telephone call campaign.

21. A system for controlling how telephony system resources are to respond during processing of a telephone call record associated with at least one telephone call campaign, said system comprising:

- at least a first call campaign initialization profile including a plurality of dynamically modifiable campaign specific parameter values, each of said plurality of dynamically modifiable campaign specific parameter values specifying a call campaign parameter used to process telephone call records associated with said at least one telephone call campaign;
- at least one telephone call campaign manager, for initiating said at least one telephone call campaign;
- at least one inbound/outbound campaign manager server, responsive to said at least one telephone call campaign manager, for controlling the initiation of a plurality of telephony application client processes, each telephony application client process, for controlling telephony system resource handling of one telephone call record associated with said at least one telephone call campaign; and
- a telephony application client process initiator, responsive to said at least one inbound/outbound campaign manager server and to said at least a first call campaign initialization profile, for initiating at least a first telephony application client process utilizing said plurality of dynamically modifiable campaign specific parameter values of said first call campaign initialization profile.

22. A method of dynamically modifying control of how telephony system resources process a telephone call record associated with at least first and second telephone call campaigns, said method comprising the steps of:

- providing at least first and second call campaign initialization profiles, each of said at least first and second call campaign initialization profiles including a plurality of dynamically modifiable campaign specific parameter values, each of said plurality of dynamically modifiable campaign specific parameter values specifying a call campaign parameter used to process telephone call records associated with said at least first and second telephone call campaigns respectively;
- initiating said at least first and second telephone call campaigns; and
- controlling the initiation of a plurality of telephony application client processes in response to said initiating of said at least first and second telephone call campaigns, wherein each telephony application client process controls telephony system resource handling of one telephone call record, said step of controlling the initiation of a plurality of telephony application client processes including the steps of:
  - initiating at least a first telephony application client process utilizing said plurality of dynamically modifiable campaign specific parameter values of said first call campaign initialization profile; and
  - initiating at least a second telephony application client process utilizing said plurality of dynamically modifiable campaign specific parameter values of said second call campaign initialization profile.

23. The method of claim 22, further including the step of providing at least one call campaign configuration data base, for storing said at least first and second call campaign initialization profiles.

24. The method of claim 22, wherein said step of initiating at least first telephony application client process includes initializing said at least first telephony application client process by reading said first call campaign initialization profile in said call campaign configuration data base.

25. The method of claim 22, wherein said step of initiating at least second telephony application client process includes initializing said at least second telephony application client process by reading said second call campaign initialization profile in said call campaign configuration data base.

26. The method of claim 22, further including the step of dynamically modifying said plurality of dynamically modifiable campaign specific parameter values included in said at least first call campaign initialization profile after commencing said processing of telephone call records associated with said at least first telephone call campaign.

27. The method of claim 22, further including the step of dynamically modifying said plurality of dynamically modifiable campaign specific parameter values included in said at least second call campaign initialization profile after commencing said processing of telephone call records associated with said at least second telephone call campaign.

28. The method of claim 26, further including after the step of dynamically modifying said plurality of dynamically modifiable campaign specific parameter values included in said at least first call campaign initialization profile the step of initiating a third telephony application client process by reading said first call campaign initialization profile modified after commencing said processing of telephone call records associated with said at least first telephone call campaign.

29. The method of claim 27, further including after the step of dynamically modifying said plurality of dynamically modifiable campaign specific parameter values included in said at least second call campaign initialization profile the step of initiating a fourth telephony application client process by reading said second call campaign initialization profile modified after commencing said processing of telephone call records associated with said at least second telephone call campaign.

30. A method of dynamically modifying control of how telephony system resources process a telephone call record associated with at least one telephone call campaign, said method comprising the steps of:

- providing at least a first call campaign initialization profile including a plurality of user selectable dynamically modifiable campaign specific parameter values, each of said plurality of dynamically modifiable campaign specific parameter values specifying a call campaign parameter used to process telephone call records associated with said at least one telephone call campaign;
- initiating said at least one telephone call campaign;
- controlling the initiation of a plurality of telephony application client processes, each telephony application client process controlling telephony system resource handling of one telephone call record; and
- initiating at least a first telephony application client process utilizing said plurality of dynamically modifiable campaign specific parameter values of said at least a first call campaign initialization profile in response to said controlling of the initiation of a plurality of telephony application client processes.

* * * * *